United States Patent
Sawai et al.

(10) Patent No.: US 8,071,183 B2
(45) Date of Patent: Dec. 6, 2011

(54) DISPLAY APPARATUS

(75) Inventors: Yuichi Sawai, Mito (JP); Osamu Shiono, Hitachi (JP); Takashi Namekawa, Hitachi (JP); Takashi Naitou, Funabashi (JP); Mitsuo Hayashibara, Hitachinaka (JP); Yuichi Kijima, Chosei (JP); Shigemi Hirasawa, Chiba (JP); Shunichi Asakura, Inba (JP); Hiroki Yamamoto, Hitachi (JP); Akira Hatori, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 785 days.

(21) Appl. No.: 11/756,653

(22) Filed: Jun. 1, 2007

(65) Prior Publication Data

US 2007/0286973 A1  Dec. 13, 2007

(30) Foreign Application Priority Data

Jun. 2, 2006  (JP) .................................. 2006-154861
Jan. 31, 2007  (JP) .................................. 2007-020308

(51) Int. Cl.
*C09K 19/00* (2006.01)
*C03C 8/00* (2006.01)

(52) U.S. Cl. .............. 428/1.5; 428/1.1; 501/11; 501/14; 501/15; 501/17; 501/21; 501/24

(58) Field of Classification Search .................... 501/11, 501/14, 15, 17, 21, 24; 428/1.1, 1.5
See application file for complete search history.

(56) References Cited

U.S. PATENT DOCUMENTS

| 2005/0233885 A1 | 10/2005 | Yoshida et al. |
| 2006/0290261 A1 | 12/2006 | Sawai et al. |
| 2007/0158021 A1* | 7/2007 | Sawai et al. .................... 156/285 |

FOREIGN PATENT DOCUMENTS

| JP | 02-267137 | 10/1990 |
| JP | 2000-206905 | 7/2000 |
| JP | 2003-192378 | 7/2003 |
| JP | 2004-250276 | 9/2004 |
| JP | 2006-342044 | * 12/2009 |

OTHER PUBLICATIONS

Chinese office action Appln. No. 200710159664.2 dated Jun. 10, 2010 with partial translation.

* cited by examiner

*Primary Examiner* — Gwendolyn Blackwell
(74) *Attorney, Agent, or Firm* — Antonelli, Terry, Stout & Kraus, LLP.

(57) ABSTRACT

A sealing glass of a low melting point phosphate glass composition contains 15 to 35% of BaO and $Sb_2O_3$ (in total) and the ratio by weight of BaO to $Sb_2O_3$ or $Sb_2O_3$ to BaO is 0.3 or less. Particularly the transition metal is vanadium and the glass contains $V_2O_5$ of 45 to 60 wt % as vanadium oxide and $P_2O_5$ of 15 to 30 wt % as phosphorus oxide. The bonding material is a mixture of a filler and a vanadate-phosphate glass that contains $V_2O_5$ of 45 to 60%, $P_2O_5$ of 20 to 30%, BaO of 5 to 15%, $TeO_2$ of 0 to 10%, $Sb_2O_3$ of 5 to 10%, and $WO_3$ of 0 to 5%. The particle size of the filler is in the range of 1 to 150 μm and the ratio of filler is 80% by volume or less of the adhesive glass.

16 Claims, 8 Drawing Sheets

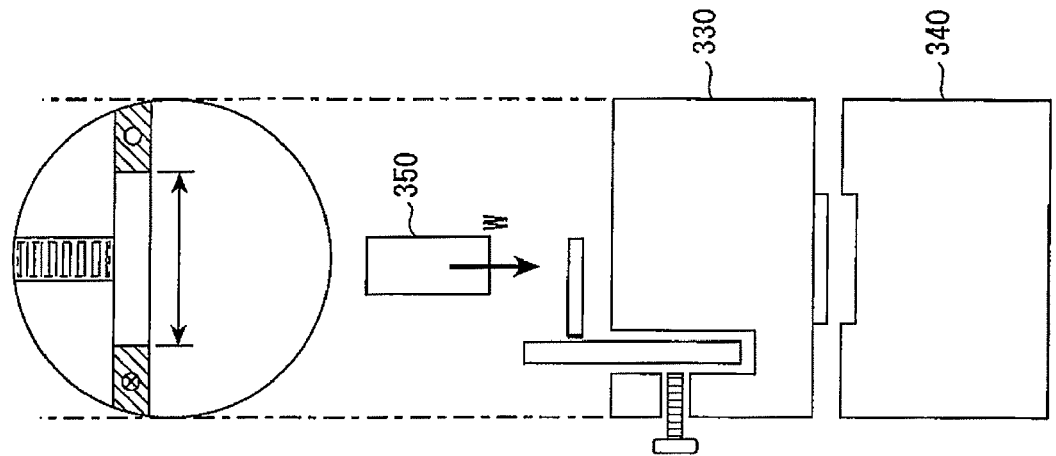
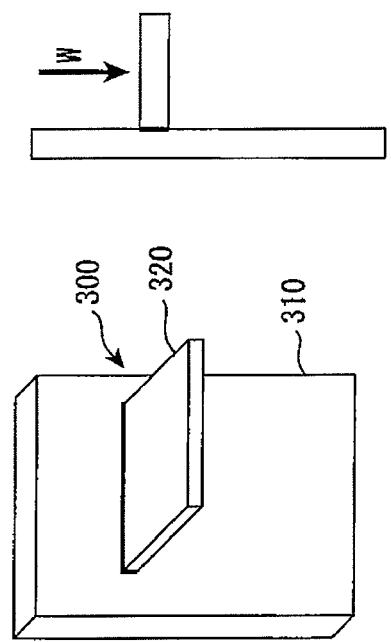
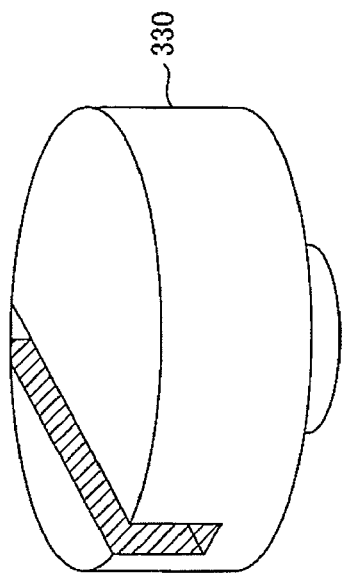

DISPLAY APPARATUS

CLAIM OF PRIORITY

The present application claims priority from Japanese applications serial No. 2006-154861, filed on Jun. 2, 2006 and serial No. 2007-20308, filed on Jan. 31, 2007, the contents of which are hereby incorporated by reference into this application.

BACKGROUND OF THE INVENTION

The present invention relates to an image display apparatus equipped with a vacuum space and to a glass bonding material for sealing or glass composition for sealing used to produce the display apparatus.

BACKGROUND ART

Recently, information processing apparatus or television apparatus have a tendency to use extended definition functions. So, flat panel display (FPD) apparatus have been in the spotlight since they have high-brilliance and high-fineness characteristics, light-weight and can be down-sized. A typical flat panel display (FPD) apparatus are liquid crystal display apparatus, plasma display apparatus, and electrons emission type image display apparatus. Further, field emission display apparatus (hereinafter called FED) have been in the spotlight. The FED uses small cold cathodes that can be integrated The FED comprises a rear substrate equipped with the above-said electron sources and a front substrate having a fluorescent material layer and anodes for forming electric fields (acceleration voltage) to cause the electrons come from electron sources thereby to run into the fluorescent material layer. These rear and front substrates are oppositely bonded to form a space between the substrates and the space is evacuated to a specified vacuum status.

Japanese Patent Laid-open No. 2000-206905 (Patent literature 1) discloses a sealing method to form a high-vacuum space by using frame glasses. A typical well-known bonding material to hermetically seal electronic parts is a glass material prepared by mixing a glass that contains PbO as the main ingredient with a filler whose coefficient of thermal expansion is low. However, since lead (Pb) is poisonous, lead-free glasses have been widely used. Japanese Patent Laid-open No. 2003-192378 (Patent literature 2) discloses a lead-free low-melting-point glass for glass sealing. Patent literature 2 discloses the use of a glass that contains $B_2O_3$ or $V_2O_5$ and BaO in place of a $PbO-B_2O_3$ glass that may cause environmental pollution. Japanese Patent Laid-open No. 2004-250276 (Patent literature 3) discloses a sealing glass that contains $V_2O_5$, ZnO, BaO, and $TeO_2$.

Patent literature 1: Japanese Patent Laid-open No. 2000-206905

Patent literature 2: Japanese Patent Laid-open No. 2003-192378

Patent literature 31: Japanese Patent Laid-open No. 2004-250276

Sealing glasses containing lead (PbO as a starting material) have been used widely. However, the water resistance of the sealing glass of a low melting point is low. For example, the surface of a part sealed by a lead-containing glass is corroded in a few minutes in the air of 85° C. and 85% RH. Accordingly, the sealed part of a high-vacuum space may be corroded in the surfaces that are in contact with the atmosphere and the vacuum may be weakened. Similarly, lead-free sealing glasses are not resistant to water, either. Further, if the sealing glass is kept at a high sealing temperature for long time, the glass becomes easily crystallized and less flowable. In extreme cases, bonding may be disabled.

Meanwhile, $V_2O_5$—$TeO_2$ glass has a large coefficient of thermal expansion. Therefore, when the $V_2O_5$—$TeO_2$ glass is used for bonding, the glass must be mixed with a great quantity of the filler such as zirconium tungsten phosphate (ZWP) whose coefficient of thermal expansion is extremely low. Since there are not so much fillers to be selected and a great quantity of the filler of the low coefficient of thermal expansion is admixed, part or whole of melted glass will be crystallized. In other words, the glass is apt to be devitrified. When devitrified, the glass loses its sealing fluidity and cannot fit in the whole bonded area. Consequently, the glass cannot accomplish the sealing purpose.

SUMMARY OF THE INVENTION

Therefore, an object of the present invention is to solve the above problems and to provide an image display apparatus that uses a sealing glass containing substantially no lead, having a high bonding strength and a long-life high-reliability by preventing reduction in vacuum of the vacuum space.

The present invention provides a display apparatus comprising a rear substrate and a front substrate wherein the substrates are oppositely placed to form a space therebetween and peripheral portions of the substrates are hermetically sealed with bonding material to keep the sealed space vacuumed. To solve the above problems, the image display apparatus of the present invention is characterized by using a glass bonding material for sealing that contains at least a transition metal, phosphorous, barium, and antimony. It is preferable that the bonding material is a mixture of filler and a glass that contains vanadium and phosphorous as the main ingredients. The above glass is characterized in that the glass is a vanadate-phosphate glass containing $V_2O_5$ of 45 to 60%, $P_2O_5$ of 15 to 30%, BaO of 5 to 25%, and $Sb_2O_3$ of 5 to 25% (by weight) in converted values as oxides.

The transition metal and phosphorus are ingredients for constituting a structure of the glass. Ba and Sb are elements for changing properties of the glass. The inventors found that the water- and moisture-resistances of glasses containing phosphorus were improved by adding Ba and Sb in specified quantities or ratios. Particularly, it is preferable that the glass contains 15 to 35% of BaO and $Sb_2O_3$ (in converted valued as oxides) and the ratio by weight of BaO to $Sb_2O_3$ or $Sb_2O_3$ to BaO is 0.3 or less. The ratios mean that the ratio of BaO to $Sb_2O_3$ is in a range of 0.3 or less, and 3.3 or more.

Representative transition metal ingredients are vanadium and tungsten. It is preferable to appropriately add Ag, Cu, Cs, Hf, Na, K or Te to the above sealing glass. The sealing temperature of the glass can be lowered by mixing these elements with the glass. The preferable ratio of respective elements in the glass is 10% by weight or less as the oxide.

The bonding material is a mixture of filler and a vanadate-phosphate glass that contains $V_2O_5$ as the main ingredient. The composition of the ingredients in the glass is $V_2O_5$ of 45 to 60%, $P_2O_5$ of 20 to 30%, BaO of 5 to 15%, $TeO_2$ of 0 to 10%, $Sb_2O_3$ of 5 to 10%, and $WO_3$ of 0 to 5% (by weight). The filler is at least one selected from the group consisting of silica glass, mullite, ceramic, fireclay refractory, steatite, alumina and spinel; the particle size of the filler is 1 to 150 μm; and an amount of the filler added to the glass is 80% by volume or less.

The use of the bonding material in accordance with the present invention can provide a display apparatus that has a sealing portion with a high bonding strength, high durability, and high yield. Further, the bonding material in accordance with the present invention has an advantage of avoiding environmental pollution due to lead and reduction of vacuum due to devitrification in the sealing process. Furthermore, since the bonding material in accordance with the present invention can improve the water- and moisture-resistances of the sealed areas, the reduction of vacuum due to deterioration of the sealing portion can be prevented.

BRIEF DESCRIPTION OF THE DRAWINGS

FIG. 1 is a schematic structure of FED, wherein

FIG. 10 is a drawing to explain the method of the bonding strength evaluation test.

PREFERRED EMBODIMENTS OF THE INVENTION

Figure 1A:
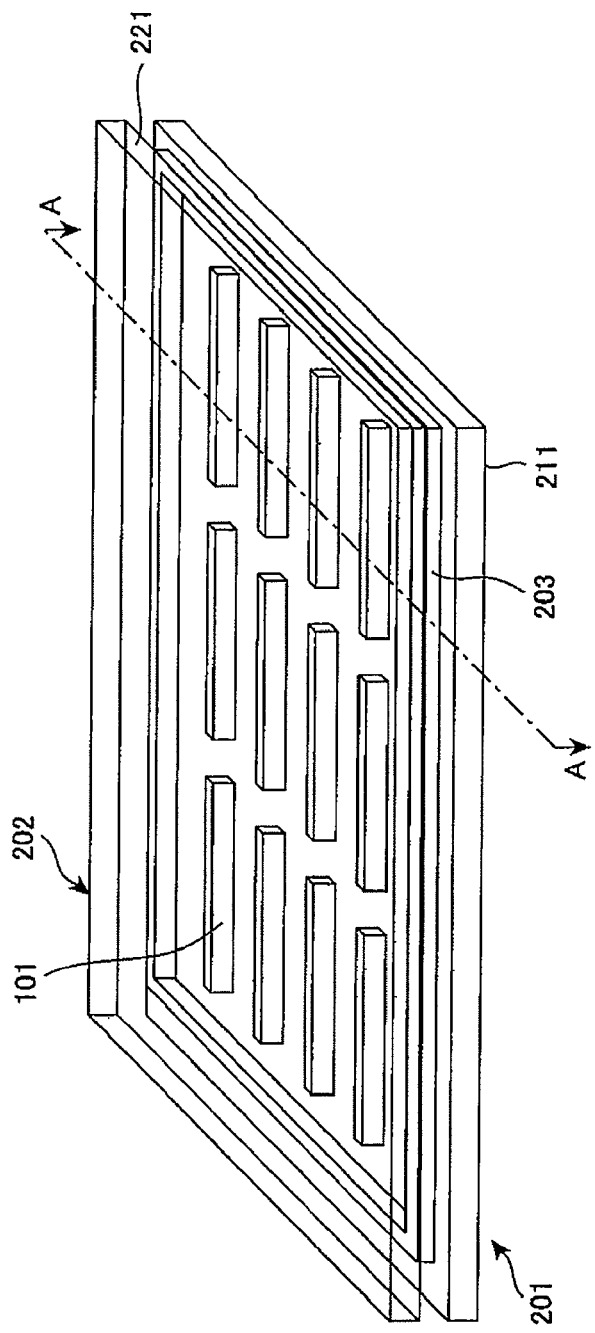
FIG. 1A is a perspective view of an FED apparatus and FIG. 1B is a sectional view taken on line A-A of FIG. 1A.

First, below will be explained the structure of a display apparatus in accordance with the present invention. A flat panel display apparatus comprises a front and rear substrate, which are oppositely arranged to form a space therebetween and the peripheral portions of the substrates are hermetically sealed with bonding material to make a unified vacuum space. The outer surface of the front substrate is the display surface of the display apparatus. The rear substrate equipped with electron sources and the front substrate is covered with a fluorescent material that is excited to emit light by electrons emitted from the electron sources. A space of about 3 to 5 mm wide is provided between the front and rear substrates and must be kept in a vacuum status. For this purpose, it is possible to provide a marginal frame on the internal rims of the front and rear substrates to thereby bond the frame to the substrates with a bonding material.

The front and rear substrates are bonded by a sealing glass directly or with a marginal frame (sealing frame) or the like between the substrates. The marginal frame must be made of glass (as a frame glass). It is preferable to bond the frame glass respectively to the rear substrate and to the front substrate. When the rear substrate is flat and the front substrate has a unified marginal frame, the rear-surface end of the marginal frame (that is opposite to the rear surface) is bonded to the rear substrate with the sealing glass.

Electron sources available to the rear substrate can be a field emission type electron source (FE type), spin type electron source, surface conductance electron source (SED type), carbon nano-tube type electron source, and thin-film type electron source such as MIM (Metal-Insulator-Metal) type, MIS (Metal-Insulator-Semiconductor), or metal-insulator-semiconductor-metal type. Well-known FE type electron sources are a spin type made of metal such as molybdenum and a semiconductor substance such as silicone and a CNT type that uses carbon nano-tubes as electron sources. A unit picture element (pixel) is made of a pair of electron sources array (a plurality of electron sources) and a fluorescent material array (a plurality of fluorescent materials. Usually, a single color picture element (pixel) consists three color unit pixels: red (R), green (G), and blue (B). As for a color picture element, each of the unit picture elements is also called a sub-picture element (sub-pixel).

The rear substrate has a lot of metal foil lines that are connected to an electron source array to transfer selection signals and display data on the inner surface of the substrate. Lines formed on the rear substrate or lines formed on the rim of the inner surface of the front substrate can be used to feed electricity to the acceleration electrodes on the inner surface of the front substrate. At least one end periphery of each substrate is provided with a line area for lines that are drawn to the rim. The peripheries of the substrates that contain the above line areas are bonding areas where the substrates are bonded to the other member with a sealing glass with lines between them.

The lines that are formed on the rear or front substrate are usually made of aluminum, silver, copper, chromium, or alloy thereof. Further, the lines can also use a lamination of these metals (for example, a Cr—Al—Cr lamination). Chromium Cr is highly wettable to glasses and preferable as a line material formed on the bonding area. The lines can be made of a metal film that is prepared by a film-forming technology. Further, the sealing glass of the present invention contains no ingredient that may corrode the lines containing Au and Ag.

Also judging from a viewpoint of line corrosion prevention, the present invention can provide a high corrosion-resistance image display apparatus.

It is also possible to use members (spacers) that are called "partition walls" to support the front and rear substrates to keep an appropriate clearance (space) between the substrates. The spacer is a plate-like member made of glass or ceramic that is a little conductive. The spacers are appropriately placed for each predetermined number of pixels so as not to interfere with pixel operations.

To facilitate a sealing work in forming a vacuum space in the image display apparatus, a glass frit that is prepared in a form of flakes or powder of the bonding glass into flakes or powder is recommended. The glass frit is used as a glass paste by dispersing the frit into a solvent such as ethanol or water and mixing it with a binder such as an organic compound. The glass paste can be made liquid when further mixed with a solvent. The binder is used to keep the shape of the glass paste when the paste is applied and dried. Amounts of the solvent and binder added to the glass paste can be changed, but usually an amount of the solvent is 20 to 30% and an amount of the binder is 10% or less (to the total weight of the paste). In actual sealing, the glass frit is prepared by mixing the above glass flakes or powder with various kinds of particles (filler or beads) whose melting point is higher than that of the sealing glass.

Figure 1B:
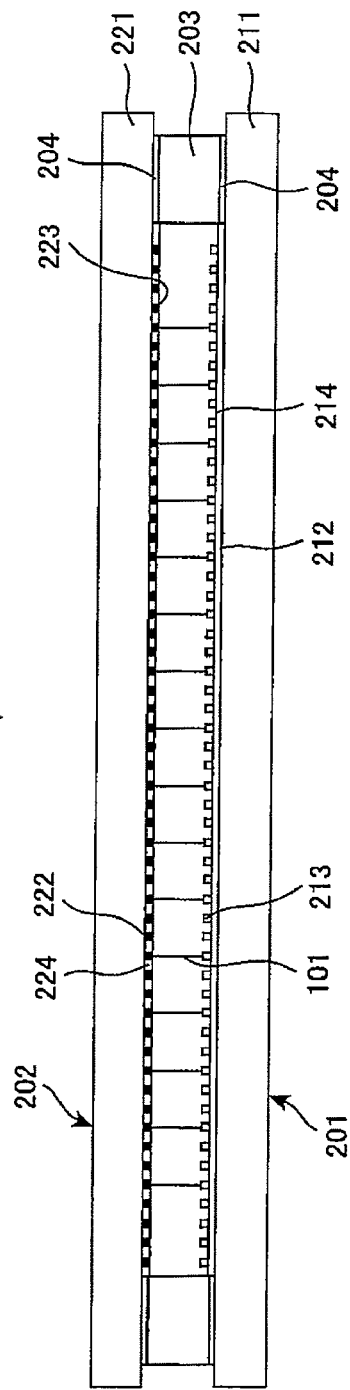

FIG. 1 is a general structure of FED. FIG. 1A is a perspective view of a FED apparatus. FIG. 1B is a sectional schematic view taken on line A-A of FIG. 1A.

Figure 2:
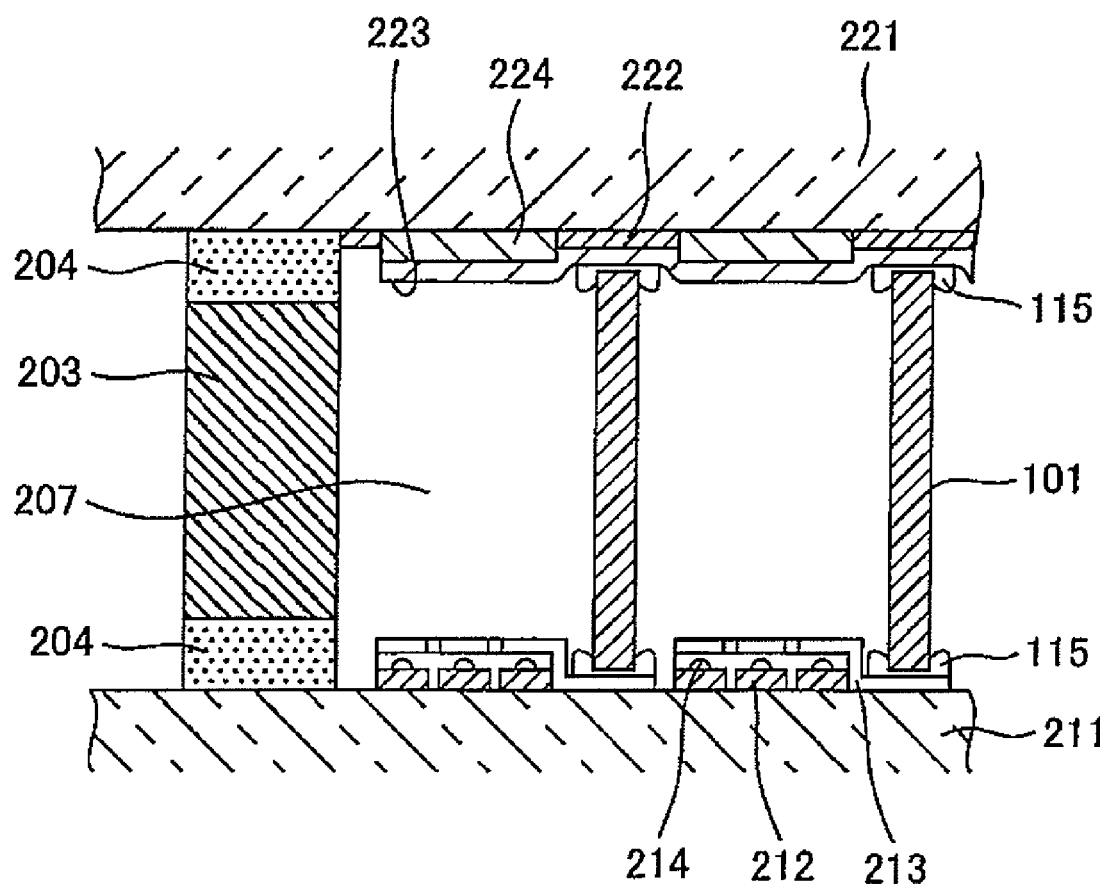
FIG. 2 is a magnified view of part of the cross-sectional schematic view taken on line A-A of FIG. 1A.

FIG. 2 is a magnified view of part of the sectional schematic view taken on line A-A of FIG. 1A.

Symbols are as follows:
101 Spacer
115 Conductive bonding layer
201 Rear substrate
202 Front substrate
203 Frame glass
204 Seal bonding layer
211 Rear substrate
212 Signal line
213 Scanning line
214 Electron sources
207 Display area
221 Front substrate
222 Light-shielding film (black matrix)
223 Anode
224 Fluorescent material layer As seen in these drawings, rear substrate 201 has signal line (data lines and cathode electrode lines) 212 and scanning line (gate electrode line) 213 on the inner surface of rear substrate 211. Electron source 214 is formed near a point at which a signal line and a scanning line cross each other. Front substrate 202 has light-shielding film (black matrix) 222, anode (metal back) 223, and fluorescent material layer 224 on the inner surface of front substrate 221.

Frame glass 203 is provided on the inner peripheries of rear substrate 211 and front substrate 221. The frame glass is bonded to the front and rear substrates with the glass bonding material of the present invention to form sealing bonding layer 204. An insulating film (not shown in the figure) is formed on a surface where the rear substrate is bonded to the frame glass of the front substrate. With this, a space part is formed between the rear substrate and the front substrate. The space part is kept in a high vacuum status and works as display area 207. In FED, spacers 101 are disposed between scanning lines 213 that are formed on the inner surface of rear substrate 211 and light-shielding film (black matrix) 222 that is formed on the inner surface of front substrate 221 and bonded to the panel with conductive bond layer 115.

Rear substrate 211 and front substrate usually use glasses as their materials. The front substrate uses a transparent glass.

In FED, the height-to-width ratio of seal bond layer 204 should preferably be 0.06 to 0.18. The width of seal bond layer 204 is the width of the marginal frame and usually be approx. 6 mm. The height is a distance between the marginal frame and the panel glass and the thickness of a part which is filled with the bonding material. If the thickness becomes smaller, the bonding part becomes more resistant to shearing stress and has greater bonding strength. If the thickness is greater, the bonding part is apt to have cracks. When the bonding material of the present invention is used and the height-to-width ratio of the seal bond layer is set in the range of 0.06 to 0.18, the bonding part has a large bonding strength and is hard to have cracks.

When assembling FED, it is preferable to coat the surface of the marginal frame in advance with the glass bonding material of the present invention. The whole surface of the frame or only part of the frame surface to be bonded to the panel glass can be coated with the glass bonding material in advance.

Meanwhile, the glass bonding material of the present invention is also available to seal panel glasses of the plasma display (PDF). Some display apparatus adopt a method of bonding two panel glasses at even intervals without using such a marginal frame that is used in PDF. In such a case, the bonding material can contain glass beads that are almost spherical as the filler. It is possible to make the thickness of the bonding part in a predetermined range corresponding to the sizes of the beads by dispersing the glass beads in the bonding part. PDF requires an aggregate in the bonding material to keep the clearance between panels constant. Glass beads play the role.

The particle size of glass beads determines the thickness of the sealing part. So the mean particle size of the glass beads should preferably be in the range of 50 to 200 μm. Particularly, it is preferable that the particle size of the glass beads is in the range of 100 to 300 μm and that the ratio of the minor axis to the major axis of the glass bead is 0.8 or more. The rate of glass beads to be added to the bonding material should be so small as to give no influence to the coefficient of thermal expansion of the bonding material, particularly in the range of 0.1 to 1.0% by volume. Since an amount of the glass beads to the bonding material is so small that the coefficient of thermal expansion of the bonding material will not be affected. It is not necessary to consider the coefficient of thermal expansion of the glass beads. If possible, however, the coefficient of thermal expansion of the glass beads should preferably be about the same as that of the filler. The glass beads have a higher melting point than that of the sealing glass so that bead particles may not be deformed in the bonding process. So the glass beads are usually made of silica or alumina particles. When the glass beads are used, the accuracy of the height determined by the glass beads can be kept if the particle size of the glass beads dispersed in the other bonding material such as filler is small enough. For example, when the front substrate and the rear substrate are oppositely bonded at their peripheries with a clearance of 100 μm between the substrates, glass beads should be those of 90 to 100 μm (equivalent to 90 to 100% of the clearance width) whose particle size and shape are accurately controlled.

The filler is added to improve the characteristics of the bonding material such as coefficient of thermal expansion, sealing temperature, electric resistance, and wettability to display components. It is possible to control the rates (% by volume) of the filler to the sealing glass in a glass frit according to applications. However, the preferable rate can be 10 to 80% (by volume) of the filler and 20 to 90% of the sealing glass. A plurality of fillers of different properties (such as coefficients of thermal expansion) can be used. Granular metal fillers and inorganic oxide fillers are available. Particularly, available inorganic oxides are for example, $SiO_2$, $ZrO_2$, $Al_2O_3$, $ZrSiO_4$, cordierite, mullite, and eucryptite.

Some kinds of fillers can be mixed according to target characteristics of bonding material. $SiO_2$ is effective to control the coefficient of thermal expansion of the bonding material since the coefficient of thermal expansion of $SiO_2$ is smaller than that of glass containing vanadium and phosphorus as the main ingredients. $Al_2O_3$ can control the viscosity of the bonding material and augment the bonding material to reduce its cost since the coefficient of thermal expansion of $Al_2O_3$ is approximately equal to that of the glass that contains vanadium and phosphorus as the main ingredients. Further, it is possible to increase the thermal conductivity of the bonding material and facilitate bonding by adding the filler whose thermal conductivity is higher than that of the sealing glass.

To prevent devitrification of the glass and to obtain bonding parts that are uniform in quality, particle sizes of the fillers are significant. If the particle size of the filler is too small, active surfaces increase and the bonding parts may be easily crystallized. Contrarily, if the particle size of the filler is too large, the filler may be dispersed uneven locally and the bonding material may not be uniform in quality. So the particle size of the filler should preferably be 0.5 μm or more but not exceeding 150 μm, and more particularly 1 to 50 μm. Further, by increasing an amount of the fillers of a small particle sizes or the quantity of the small filler, the bonding material becomes higher in viscosity and will not be easily sucked into the vacuumed space during bonding. Therefore, the particle size of the filler should preferably be in the range of 1 to 10 μm and more particularly in the range of 1 to 5 μm.

DETAILED DESCRIPTION OF EMBODIMENTS OF THE INVENTION

Embodiment 1

Figure 3:
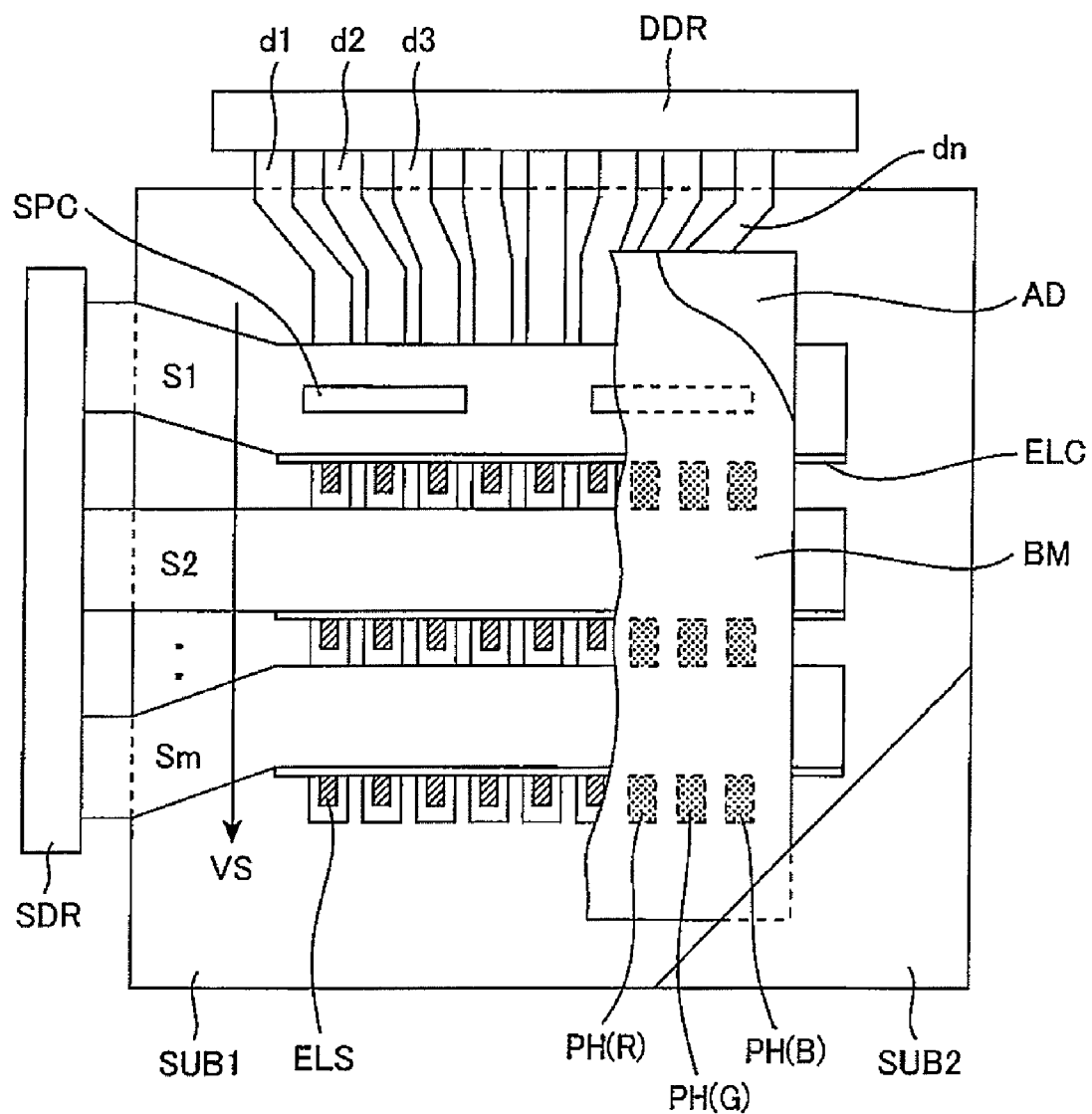
FIG. 3 is a partially broken schematic plane view for explaining the structure of a flat-panel display apparatus of FIG. 1.

Embodiments 1 to 3 are examples of increasing the water resistance of the bonding material and improving its durability. These embodiments will be explained in detail referring to the drawings below. FIG. 3 is a schematic plane view to explain the structure of a flat-panel display apparatus. This display apparatus example uses an MIM (Metal-Insulator-Metal) type electron source.

By the way, in addition to the display apparatus of this embodiment, the present invention can also be applied to various kinds of display apparatus and field emission type display apparatus that use wire-formed glass plates such as electrons emission type that use thin-film electron sources and plasma display apparatus. Further, the present invention is not limited to structural materials such as substrates for flat-panel display apparatus and their bonding and vacuum-sealing material. The present invention can also be applied to glass structural members for electronic apparatus such as magnetic disk substrates and structural materials in other technical fields.

Figure 4:
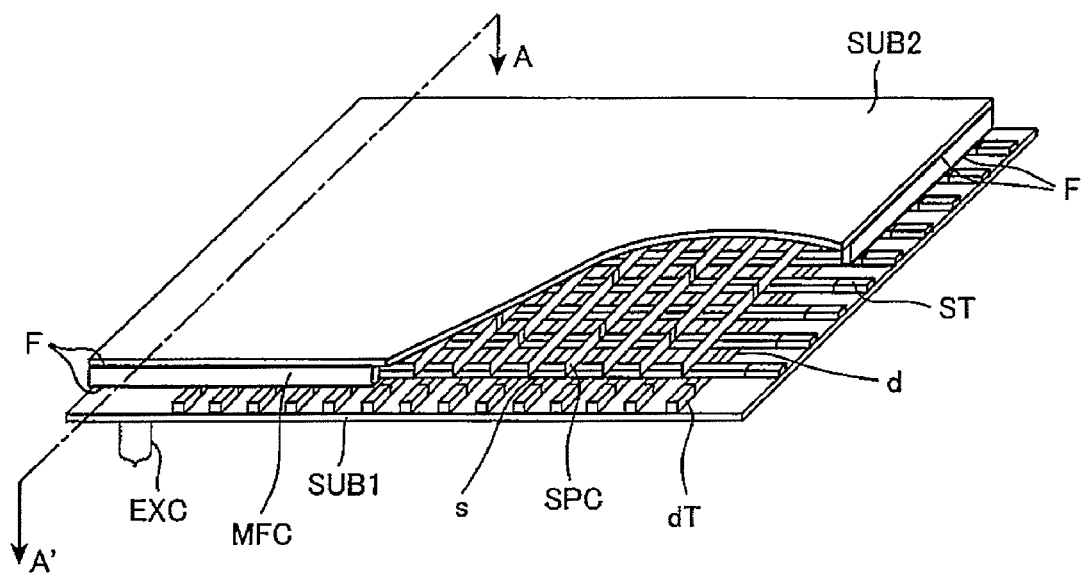
FIG. 4 is a detailed perspective view of the whole structure of the flat-panel display apparatus of FIG. 1.
Figure 5:
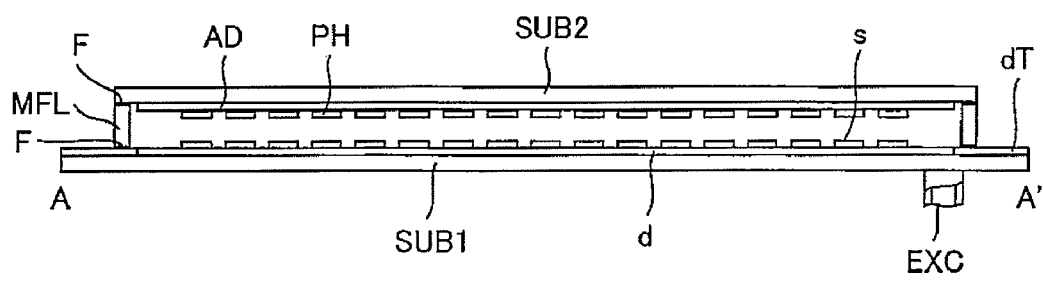
FIG. 5 is a cross-sectional view taken on line of A-A' of FIG. 4.

FIG. 4 is a detailed perspective view of the whole structure of the flat-panel display apparatus of FIG. 3. FIG. 5 is a sectional view taken on line of A-A' of FIG. 4.

Symbols are as follows:
SUB1 Rear substrate
SUB2 Front substrate
s (s1, s2, . . . sm) Scanning signal line
d (d1, d2, d3, . . . ) Image signal line
ELS Electron sources
ELC Connection electrode
AD Anode
BM Black matrix
PH (PH(R), PH(G), PH(B)) Fluorescent material layer
SDR Scanning signal line drive circuit
DDR Image signal line drive circuit In FIG. 3, FIG. 4, and FIG. 5, image signal lines d (d1, d2, . . . dn) are formed on the inner surface of rear substrate SUB1. Scanning signal lines s (s1, s2, s3, . . . sm) are formed transversely over the image signal lines. Electron sources ELS are power-supplied by scanning signal lines s (s1, s2, s3, . . . sm) through the connection electrode ELC. Symbol VS indicates a vertical scanning direction.

Front substrate SUB2 is a little smaller than rear substrate SUB1. Lines dT that are lead-out terminals of image signal lines d and lines sT that are lead-out terminals of scanning signal lines s are formed on the side face of rear substrate SUB1 that protrudes from front substrate SUB2. Fluorescent material layers of three colors PH (PH(R), PH(G), and PH(B)) are formed on the inner surface of front substrate SUB2. Anodes AD are formed on them. Anodes AD are made of an aluminum layer. In actual operation, a voltage of approx. 2 kV to 10 kV is applied to anodes AD on the front substrate.

In this structure, fluorescent materials PH (PH(R), PH(G), and PH(B)) are partitioned by light-shielding layer (black matrix) BM. Although anode AD is shown as a solid electrode, it can be stripe electrodes that are traverses scanning signal lines s (s1, s2, s3, . . . sm) to form the stripe electrodes separated for every pixel row. Electrons emitted from electron sources ELS are accelerated and bombarded to fluorescent material layers PH (PH(R), PH(G), and PH(B)) that constitute sub-picture elements. With this, the fluorescent material layer PH emits light of a predetermined color. The light is mixed with lights of colors from fluorescent materials of the other sub-pixels to form a color image of a predetermined color.

As shown in FIG. 4 and FIG. 5, rear substrate SUB1 and front substrate SUB2 are bonded together with sealing frame MFL that surrounds and encloses the display area. The bonding of rear substrate SUB1, front substrate SUB2, and sealing frame MFL is accomplished with glass sealing bonding material. As explained referring to FIG. 3, the inner surface of rear substrate SUB1 that is enclosed in the sealing area contains a plurality of electron sources in a display area that comprises a matrix of image signal lines d (d1, d2, d3, . . . dn) and scanning signal lines s (s1, s2, s3, . . . sm). Lines dT and lines sT are led out over the sealing area on which sealing frame MFL is placed.

Supplied power from anode lines AD runs to rear substrate SUB1 through conductors that connect substrates (not shown in the drawing) and goes out as lead-out terminals (line) on appropriate part of rear substrate SUB1 over the sealing area on which sealing frame MFL is place.

This embodiment employs a method of positioning sealing frame MFL in the sealing area from which lines are led out between front substrate SUB2 and rear substrate SUB1 and bonding the sealing frame with glass bonding material F for sealing. The peripheries of the front substrate SUB2 and rear substrate SUB1 that are oppositely placed are sealed and fixed with sealing glass bonding material F so that the sealed space between the substrates may be isolated from the outside. This embodiment uses a glass frit as the sealing glass.

When the glass bonding material is used for sealing, the material is heated at approx. 450° C., for example. The sealing method comprises steps of preparing a glass paste, applying the paste to the peripheries of the substrate by a dispenser, drying the paste at approx. 250° C., for example, to evaporate the solvent, temporarily baking the paste at approx. 460° C. to burn away the binder and melt the glass, placing a sealing frame (marginal frame) on the molten glass, baking thereof at 450° C. to fix the sealing frame, evacuating gas from the inside of the vacuum space of the display apparatus down to a pressure of approx. 1 μPa through exhaust pipe 303, and sealing up the exhaust pipe.

It is preferable that the bonding material to bond the marginal frame to the front substrate is different from the bonding material to bond the marginal frame to the rear substrate in softening points. The bonding displacement of the marginal frame is hard to be caused when the softening point of the bonding material which bonds the marginal frame to the front or rear substrate is higher than the softening point of the bonding material which bonds the marginal frame to the other substrate, if bonding with the bonding material of the higher softening point is done, followed by bonding the bonding material of the lower softening point. It is also possible to use, as front substrate SUB2, a substrate in the form of a bordered shallow dish whose rim is protruded and bent towards rear substrate SUB1 and sealing the front and rear substrates at the rim at which the substrates touch each other. In this case, the sealing glass is applied only to the rim of the rear substrate.

When spacers SPC are fixedly provided to keep an even clearance in the sealed space between the front and rear substrates, it is preferable to apply the sealing glass of this embodiment to areas at which spacers SPC are bonded to the front and rear substrates. As already explained, this is because the glass of this embodiment is hard to releases moisture into the vacuum. Usually, spacers SPC are disposed over scanning signal lines s.

Table 1 lists examples of glass bonding materials for sealing to explain compositions and characteristics of the sealing glass bonding materials of the embodiment. Table 1 lists glass samples SPL-01 to SPL-30 because they differ in rates of ingredients. The content of each ingredient is given percentage by weight (wt %) of its converted values as oxides. The starting materials are $V_2O_5$ (Kojundo Chemical Lab. Co., Ltd.; Purity of 99.9%), $BaCO_3$ (Kojundo Chemical Lab. Co., Ltd.; Purity of 99.9%), $P_2O_5$ (Kojundo Chemical Lab. Co., Ltd.; Purity of 99.9%), and $Sb_2O_3$ (Wako Fine Chemicals Co., Ltd; Purity of 99.9%). Sample SPL-28 is almost the same as sample SPL-27 in composition but SPL-28 uses barium phosphate instead of $P_2O_5$ as a P supply source. The other starting materials are $V_2O_5$, $BaPO_3$, and $Sb_2O_3$.

TABLE 1

| Sample name | Ingredients (% by weight) | | | | | Thermal characteristics | | | Water resistance 2 h (70° C.) | |
|---|---|---|---|---|---|---|---|---|---|---|
| | | | | | | Coefficient of thermal expansion ($\times 10^{-7}$/° C.) | Transition point (° C.) | Softening point (° C.) | Before test (g) | After test (g) |
| | $V_2O_3$ | $P_2O_5$ | BaO | $Sb_2O_3$ | Others | | | | | |
| SPL-01 | 45 | 15 | 20 | 20 | | 78.5 | 403 | 485 | 0.837 | 0.835 |
| SPL-02 | 45 | 20 | 20 | 15 | | 77.6 | 410 | 496 | 0.821 | 0.818 |
| SPL-03 | 45 | 30 | 15 | 10 | | 79.0 | 415 | 515 | 0.722 | 0.720 |
| SPL-04 | 45 | 40 | 10 | 5 | | 79.3 | 422 | 520 | 0.710 | 0.687 |
| SPL-05 | 45 | 50 | 3 | 2 | | 78.5 | 435 | 535 | 0.774 | 0.739 |
| SPL-06 | 45 | 15 | 5 | 35 | | 78.3 | 401 | 483 | 0.736 | 0.732 |
| SPL-07 | 45 | 20 | 5 | 30 | | 77.4 | 408 | 494 | 0.752 | 0.752 |
| SPL-08 | 45 | 30 | 5 | 20 | | 78.8 | 413 | 512 | 0.737 | 0.737 |
| SPL-09 | 45 | 40 | 5 | 10 | | 79.1 | 420 | 517 | 0.746 | 0.741 |
| SPL-10 | 45 | 50 | 5 | 0 | | 78.3 | 433 | 532 | 0.699 | 0.686 |
| SPL-11 | 45 | 15 | 35 | 5 | | 84.8 | 413 | 497 | 0.706 | 0.699 |
| SPL-12 | 45 | 20 | 30 | 5 | | 83.8 | 420 | 508 | 0.780 | 0.780 |
| SPL-13 | 45 | 30 | 20 | 5 | | 85.3 | 425 | 527 | 0.782 | 0.782 |
| SPL-14 | 45 | 40 | 10 | 5 | | 85.6 | 432 | 532 | 0.744 | 0.740 |
| SPL-15 | 45 | 50 | 0 | 5 | | 84.8 | 445 | 548 | 0.759 | 0.726 |
| SPL-16 | 54 | 15 | 15 | 16 | | | | | | |
| SPL-17 | 54 | 20 | 10 | 16 | | 85.2 | 355 | 437 | 0.760 | 0.718 |
| SPL-18 | 54 | 25 | 10 | 11 | | 86.3 | 358 | 438 | 0.754 | 0.750 |
| SPL-19 | 54 | 30 | 5 | 11 | | 84.9 | 362 | 445 | 0.713 | 0.707 |
| SPL-20 | 54 | 35 | 5 | 6 | | 85.0 | 366 | 461 | 0.720 | 0.687 |
| SPL-21 | 54 | 15 | 5 | 26 | | | | | | |
| SPL-22 | 54 | 20 | 5 | 21 | | 84.6 | 345 | 415 | 0.794 | 0.794 |
| SPL-23 | 54 | 25 | 4 | 17 | | 85/7 | 348 | 426 | 0.820 | 0.820 |
| SPL-24 | 54 | 30 | 3 | 13 | | 84.3 | 352 | 433 | 0.824 | 0.824 |
| SPL-25 | 54 | 35 | 0 | 11 | | 84.4 | 356 | 448 | 0.861 | 0.736 |
| SPL-26 | 54 | 15 | 26 | 5 | | | | | | |
| SPL-27 | 54 | 20 | 21 | 5 | | 87.1 | 375 | 460 | 0.690 | 0.690 |
| SPL-28 | 54 | 20 | 21.6 | 4.4 | | 98.9 | 360 | 435 | 0.689 | 0.689 |
| SPL-29 | 54 | 25 | 17 | 4 | | 88.2 | 378 | 463 | 0.811 | 0.811 |
| SPL-30 | 54 | 30 | 13 | 3 | | 86.8 | 382 | 470 | 0.718 | 0.718 |
| SPL-31 | 54 | 35 | 11 | 0 | | 86.9 | 386 | 487 | 0.715 | 0.641 |
| SPL-32 | 65 | 15 | 10 | 10 | | | | | | |
| SPL-33 | 65 | 20 | 5 | 10 | | | | | | |
| SPL-34 | 65 | 25 | 5 | 5 | | 77.0 | 316 | 395 | 0.765 | 0.570 |
| SPL-35 | 65 | 30 | 2 | 3 | | 78.2 | 325 | 409 | 0.777 | 0.612 |
| SPL-36 | 65 | 35 | 0 | 0 | | 79.0 | 330 | 425 | 0.704 | 0.419 |
| SPL-37 | 65 | 15 | 4 | 16 | | | | | | |
| SPL-38 | 65 | 20 | 3 | 12 | | | | | | |
| SPL-39 | 65 | 25 | 2 | 8 | | 76.2 | 314 | 392 | 0.782 | 0.698 |
| SPL-40 | 65 | 30 | 1 | 4 | | 77.4 | 323 | 406 | 0.744 | 0.632 |
| SPL-41 | 65 | 15 | 16 | 4 | | | | | | |
| SPL-42 | 65 | 20 | 12 | 3 | | | | | | |
| SPL-43 | 65 | 25 | 8 | 2 | | 78.5 | 321 | 401 | 0.760 | 0.682 |
| SPL-44 | 65 | 30 | 4 | 1 | | 79.8 | 330 | 415 | 0.754 | 0.592 |
| HPL-1 | 55 | 0 | 10 | 10 | $TeO_2 = 25$ | 144.5 | 290 | 355 | 0.885 | 0.786 |

| Sample name | Water resistance 2 h (70° C.) Weight change rate (%) | Constant-temperature constant-humidity test (in the air of 85° C., 85% RH) | | | |
|---|---|---|---|---|---|
| | | Before test (g) | After test (g) | Weight change rate (%) | Sample appearance |
| SPL-01 | 0.167 | 1.000 | 0.995 | 0.500 | Δ |
| SPL-02 | 0.355 | 1.020 | 1.012 | 0.784 | Δ |
| SPL-03 | 0.400 | 1.000 | 0.988 | 1.200 | Δ |
| SPL-04 | 3.330 | 1.000 | 0.900 | 10.000 | X |
| SPL-05 | 4.500 | 1.050 | 0.950 | 9.524 | X |
| SPL-06 | 0.565 | 1.060 | 1.042 | 1.698 | Δ |
| SPL-07 | 0.000 | 1.000 | 1.000 | 0.000 | ◉ |
| SPL-08 | 0.000 | 1.020 | 1.019 | 0.098 | ○ |

TABLE 1-continued

| | | | | | |
|---|---|---|---|---|---|
| SPL-09 | 0.666 | 1.000 | 0.980 | 2.000 | Δ |
| SPL-10 | 1.861 | 1.020 | 0.963 | 5.588 | X |
| SPL-11 | 0.977 | 1.030 | 1.015 | 1.456 | Δ |
| SPL-12 | 0.000 | 1.051 | 1.051 | 0.000 | ◎ |
| SPL-13 | 0.000 | 1.000 | 0.999 | 0.100 | ○ |
| SPL-14 | 0.499 | 1.000 | 0.985 | 1.500 | Δ |
| SPL-15 | 4.323 | 1.040 | 0.905 | 12.981 | X |
| SPL-16 | | | | | |
| SPL-17 | 5.550 | 1.020 | 0.850 | 16.667 | X |
| SPL-18 | 0.453 | 1.030 | 1.016 | 1.359 | Δ |
| SPL-19 | 0.900 | 1.060 | 1.042 | 1.698 | Δ |
| SPL-20 | 4.562 | 1.000 | 0.863 | 13.700 | X |
| SPL-21 | | | | | |
| SPL-22 | 0.000 | 1.002 | 1.002 | 0.000 | ◎ |
| SPL-23 | 0.000 | 1.030 | 1.030 | 0.000 | ◎ |
| SPL-24 | 0.000 | 1.020 | 1.019 | 0.098 | ○ |
| SPL-25 | 14.552 | 1.000 | 0.563 | 43.700 | X |
| SPL-26 | | | | | |
| SPL-27 | 0.000 | 1.020 | 1.020 | 0.000 | ◎ |
| SPL-28 | 0.000 | 1.000 | 1.000 | 0.000 | ◎ |
| SPL-29 | 0.000 | 1.000 | 1.000 | 0.000 | ◎ |
| SPL-30 | 0.000 | 1.050 | 1.049 | 0.095 | ○ |
| SPL-31 | 10.390 | 1.000 | 0.688 | 31.200 | X |
| SPL-32 | | | | | |
| SPL-33 | | | | | |
| SPL-34 | 25.500 | 1.000 | 0.455 | 54.500 | X |
| SPL-35 | 21.245 | 1.000 | 0.362 | 63.800 | X |
| SPL-36 | 40.500 | 1.020 | 0.000 | 100.000 | X |
| SPL-37 | | | | | |
| SPL-38 | | | | | |
| SPL-39 | 10.715 | 1.010 | 0.685 | 32.178 | X |
| SPL-40 | 15.000 | 1.000 | 0.588 | 41.200 | X |
| SPL-41 | | | | | |
| SPL-42 | | | | | |
| SPL-43 | 10.284 | 1.020 | 0.705 | 30.882 | X |
| SPL-44 | 21.479 | 1.000 | 0.355 | 64.500 | X |
| HPL-1 | 11.232 | 1.050 | 0.150 | 85.714 | X |

To prepare samples of the sealing glass bonding materials, starting materials were mixed in weight rates listed in Table 1.

Considering that $BaCO_3$ is finally decomposed into BaO and $CO_2$, the weight of $BaCO_3$ was calculated as an equivalent amount to BaO. All starting materials excluding $P_2O_5$ were mixed in advance. This is because $P_2O_5$ is highly hygroscopic and its weight changes quickly by absorption of moisture from the air when $P_2O_5$ is left in the open air for a long time. The mixture of the starting materials excluding $P_2O_5$ was put in a platinum crucible, and the platinum crucible was placed on a balance, A required amount of $P_2O_5$ was weighed and mixed with the powder mixture in the platinum crucible on the scale with a metallic spoon; and immediately mixed up the materials in the crucible. In this case, it is preferable that a mortar and a ball mill for mixing are not used to avoid absorption of moisture from the atmosphere.

The platinum crucible containing the powder mixture of the materials was placed in a glass melting furnace, followed by starting heating at a heat-up rate of 5° C./min, and keeping the target temperature for one hour after the temperature reaches the target temperature. This embodiment sets the target temperature to 1000° C. The molten mixture was stirred for one hour, followed by taking out the platinum crucible from the glass melting furnace, casting the molten mixture into a graphite mold that is kept at 300° C. in advance, moving the graphite mold with the molten mixture into the unstraining furnace which was kept at a predetermined unstraining temperature, leaving the crucible in the furnace for one hour to unstrain the glass, and cooling the crucible down to the room temperature at a cooling rate of 1° C./min. The obtained glass block is 30 mm×40 mm×80 mm. The glass block was crushed into pieces of 4 mm×4 mm×15 mm each, and the coefficient of thermal expansion (α), glass transition point (Tg), and glass softening point of each glass piece were measured and evaluated. The water resistance test and the constant temperature and humidity test were conducted on each glass piece of the same shape. In preparation of glass samples, samples SPL-16, 21, 26, 32, 33, 37, 38, 41, and 42 were not prepared successfully since their ratios of phosphorus to vanadium were not in the vitrification range. It is preferable that the rate (% by weight) of $V_2O_5$ is 45 to 60 and the rate (% by weight) of $P_2O_5$ is 15 to 30.

A water resistance test method is performed is shown in the following.

Water of 100 cc at 70° C. was put in a 200-cc beaker; one weighed glass piece of this embodiment was put in the beaker; the beaker was placed in a double boiler of 70° C.; the beaker was kept at 70° C. for 2 hours; the glass piece was taken out and dried on a heater at 150° C. for 30 minutes, and measured the weight of the dried glass piece. The weight change of the glass sample was calculated by the following expression:

A rate of change in weight of the glass sample before and after the water-resistance test=(weight of glass piece before water-resistance test−weight of glass piece after water-resistance test)/weight of the glass piece before water-resistance test×100 (%).

The constant-temperature and constant-humidity test method is shown below.

Each glass piece was ground into powder, followed by preparing a molded form of 1 gram, placing it on a soda glass substrate, and baking it at 450° C. for 30 minutes in the atmosphere to obtain a simulation sample. Then, the simulation sample was put in a thermostat chamber, followed by keeping it in the humid air of 85° C. and 85% RH for 48 hours, washing the tested sample in an ultrasonic washer to completely remove glass ingredients that were effectually decomposed and dissociating and drying the tested glass piece on a heater at 150° C. for 30 minutes. Similarly to the above-described water-resistance test, the weight change of the glass piece was calculated by the following expression:

A rate of change in weight of the glass sample before and after the constant-temperature and constant-humidity test= (weight of glass piece after constant-temperature and constant-humidity test−weight of glass piece before constant-temperature and constant-humidity test)/weight of glass piece before constant-temperature and constant-humidity test×100 (%). We evaluated the tested glass pieces by appearance and classified them as follow:

Evaluation "⊚": The rate of change in weight of this glass sample before and after the test is 0.1% or less. This tested glass sample is glossy as ever and no appearance change is found on the surface of the glass sample.

Evaluation "○": The rate of change in weight of this glass sample before and after the test is 0.1% or less. However, the tested glass sample is less glossy.

Evaluation "Δ": The rate of change in weight of this glass sample before and after the test is 0.1% or more but not exceeding 5.0%.

Evaluation "x": The rate of change in weight of this glass sample before and after the test is 5.0% or more.

Table 1 shows the results of evaluation of glass samples after the water resistance test and the constant-temperature and constant-humidity test.

As for samples SPL-01, 02, 03, 06, 09, 11, 14, 18 and 19, the rate of change in weight of respective glass samples is 1% or less when kept in hot water of 70° C. for 2 hours. As for samples SPL-07, 08, 12, 13, 22, 23, 24, 27, 28, 29, and 30, which are in accordance with the embodiment, no change was found in weight of respective glass samples after the test. Judging from the result of the water resistance test, if the total ratio of Ba and Sb is smaller than 15% and over 35%, water resistance of the glass sample is not so good.

Judging from the results of the constant-temperature and constant-humidity test, we find that glass samples SPL-2, 3, 4, 9, 14, 17, 18, and 19 whose amount (BaO+Sb$_2$O$_3$) is 15 to 35 wt % and the BaO/Sb$_2$O$_3$ or Sb$_2$O$_3$/BaO ratio by weight is not 0.3 or less are relatively resistant to water and can be used as a sealing glass bonding material although the samples are a little deteriorated in the constant-temperature and constant-humidity condition. Accordingly, the results of evaluation of glasses of the embodiment after the constant-temperature and constant-humidity test are all "⊚" or "○"

By the way, the test results of samples SPL-28 and SPL-16 are almost the same although their starting materials are partially different and their evaluations after the constant-temperature and constant-humidity test are "⊚." As comparative examples, sample HPL-1 that contains TeO$_2$ was prepared and evaluated. After the constant-temperature and constant-humidity test, HPL-1 lost its gloss and changed its color to yellowish dark green. This indicates that HPL-1 is deteriorated by humidity.

Although the above examples use vanadium as a transition metal which is one of the main ingredients of the glass, glass samples using tungsten as a transition metal can produce the similar effect.

Accordingly, these glass bonding materials enable sealing and bonding in high-humidity atmosphere.

Embodiment 2

Figure 6:
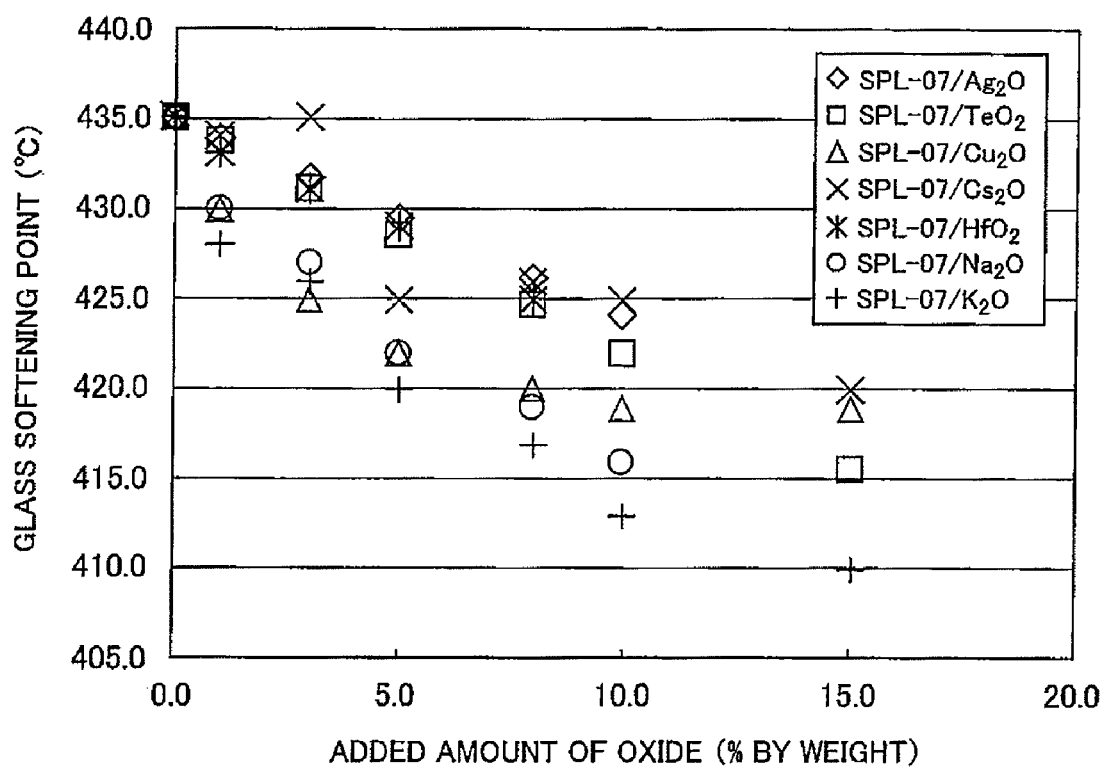
FIG. 6 is a graph showing the effect of lowering the glass softening point of the sealing glass in accordance with the present invention.

To lower the melting point of the glass bonding material in accordance with the present invention, various additive materials were searched and studied. The compositions of SPL-27 as a representative sample were selected in the above embodiment. Ag$_2$O, Cu$_2$O, Cs2$_o$, HfO$_2$, Na$_2$O, K$_2$O and/or TeO$_2$ was added to the powder mixture of glass materials while changing the rates of the added compound, and checked how their glass transition points changed. As seen from FIG. 6 which lists the test results, we found that additives of Ag$_2$O, Cu$_2$O, Cs$_2$O, HfO$_2$, Na$_2$O, K$_2$O, and TeO$_2$ respectively have an effect to lower the transition point of the glass bonding material in accordance with the present invention. By the way, when the additives are added too much, crystals are deposited in the glass. Accordingly, it is preferable that the rate (% by weight) of the additives is 1 to 10%. It is assumed that, when an additive material is added too much, the relative ratios of vanadium and phosphorus becomes lower and go beyond the vitrification range and consequently crystals are deposited in the glass.

Embodiment 3

Figure 7:
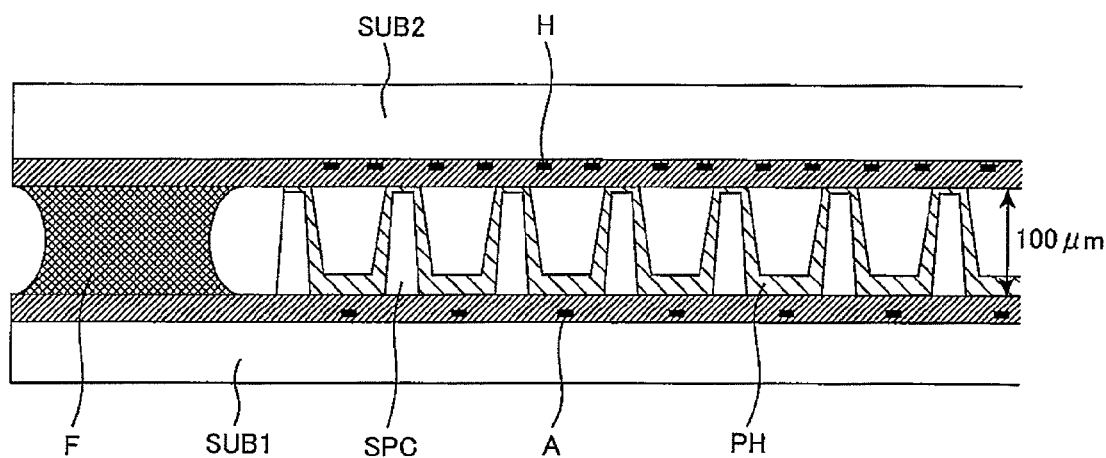
FIG. 7 is a cross-sectional view showing a rib of the plasma display to which the glass of the present invention is applied.

FIG. 7 is a cross-sectional schematic diagram to explain the structure of a plasma display apparatus.

Figure 8:
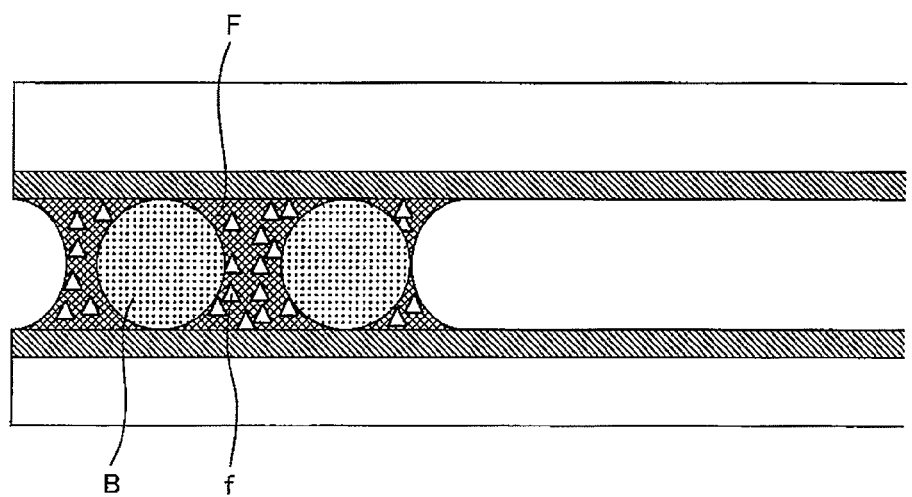
FIG. 8 is a cross-sectional view of glass beads and filler added to the sealing glass of the present invention.

The plasma display apparatus of Embodiment 3 of this invention is equipped with rear substrate SUB1 and front substrate SUB2 which are oppositely faced and bonded at their peripheries with bonding material F that uses the glass composition of this embodiment. The front substrate is equipped with discharge electrodes H and the rear substrate is equipped with address electrodes A. These electrodes are protected by a protective layer. Rib spacers SPC are disposed among pixels and work as partition walls to keep an appropriate clearance (space) between the front and rear substrates. Each pixel contains fluorescent materials PH of three colors (red, green, and blue). This embodiment prepares the ribs with a glass composition that satisfies the composition range of a glass bonding material that contains Ba and Sb of the above specified ratios. This glass excels at resistance to water and moisture and its hygroscopic property is low. Accordingly, when this glass is used as a material for members in the vacuum space, this glass absorbs very little moisture during production and storage of the members and consequently will discharge almost no moisture when they are placed in a vacuum status. FIG. 8 shows a modification of the embodiment that adds glass beads B and filler f are added to bonding material F. Since the glass beads dispersed in the bonding material have almost the same diameters, the thickness of bonding material can be made constant over the whole apparatus.

In the production of the plasma display apparatus, the vacuum space formed between the front and rear substrates is temporarily heated, evacuated, and then filled with a rare gas. The glass of this embodiment is also available in the evacuating process for evacuating the vacuum space (that is provided for image displaying) during heating since the glass composition has a low hygroscopic property. Further, the panels will not be deteriorated even when the panels are temporarily stored before or after the evacuating process.

Embodiment 4

Embodiments 4 to 6 explain the bonding materials, which improves the bonding strength and other properties of the bonding materials by controlling addition of fillers. The glass bonding materials of Embodiment 4 can be produced by adding a filler powder to a vanadate-phosphate glass, which is a base material of the glass. First, below will be explained the base material of the glass of Embodiment 4. Then will be explained bonding of a member with a glass bonding material to which a filler is added and mixed.

In production of a display apparatus, two glass panels must be hermetically sealed. In production of FED, a marginal frame is placed on the peripheries of two glass panels and bonded the bonding material. The coefficient of thermal expansion of glass plates such as widely-used soda glass and glass whose main component is silica in the range of 70 to $80 \times 10^{-7}/°$ C. Therefore, the coefficient of thermal expansion of the bonding material should preferably be close to that of the glass panel. Further, the bonding material should have a high bonding strength without causing devitrification in the sealing process.

The coefficient of thermal expansion of a vanadate-phosphate glass containing $V_2O_5$ as the main ingredient is $90 \times 10^{-7}/°$ C. or less and in most cases, in the range of 60 to $90 \times 10^{-7}/°$ C. when the rates of ingredients are $V_2O_5$ of 45 to 60%, $P_2O_5$ of 20 to 30%, BaO of 5 to 15%, $TeO_2$ of 0 to 10%, $Sb_2O_3$ of 5 to 10%, and $WO_3$ of 0 to 5% (by weight). Since the coefficient of thermal expansion of the glass can be made smaller, a selection of the filler materials to be added to the glass becomes wider thereby to make the coefficient of thermal expansion of the glass closer to that of the sealing glass. Consequently, we can select ceramics that has a stable property. Further, since this can reduce the quantity of fillers to be added, the devitrification of the glass can be suppressed. It is necessary to keep the above amounts of the ingredient so as to produce the glass of a coefficient of thermal expansion in the range of 60 to $90 \times 10^{-7}/°$ C. or less.

Compounds $V_2O_5$ and $P_2O_5$ in the vanadate-phosphate glass (that is a glass base material) work as ingredients to produce glass. Compounds BaO, $TeO_2$, $Sb_2O_3$ and $WO_3$ work to control the properties of the glass such as coefficient of thermal expansion, fluidity, and the softening point. $TeO_2$ has an effect of lowering the melting point of the glass and the sealing temperature.

Since the coefficient of thermal expansion of the above glass bonding material is small, the above glass bonding material can be successfully used as a filler material if its coefficient of thermal expansion is $60 \times 10^{-7}/°$ C. or less. Practically, it is preferable to select a filler material from a group of silica glass, mullite, ceramic, fireclay refractory, steatite, alumina and spinel that are stable in properties.

When a glass is used as a bonding material for sealing, it is preferable that the vanadate-phosphate glass of the glass base material has an electric resistivity of $10^8$ $\Omega$·cm or more and a coefficient of thermal expansion in the range of 60 to $90 \times^{-7}/°$ C. It is also preferable that the filler has a coefficient of thermal expansion of $60 \times 10^{-7}/°$ C. or less, a rate is 80% or less (by volume), and a particle size is 1 to 150 μm. This can be accomplished by the above glass bonding material.

In the production of the glass base material, the starting materials are $V_2O_5$ (Kojundo Chemical Lab. Co., Ltd.; Purity of 99.9%), $P_2O_5$ (Kojundo Chemical Lab. Co., Ltd.; Purity of 99.9%), BaO (Wako Fine Chemicals Co., Ltd.; Purity of 99.9%), $Sb_2O_3$ (Kojundo Chemical Lab. Co., Ltd.; Purity of 99.9%), $WO_3$ (Wako Fine Chemicals Co., Ltd.; Purity of 99.9%), and $TeO_2$ (Wako Fine Chemicals Co., Ltd.; Purity of 99.9%). Table 2 shows the ingredient compositions (% by weight) of $V_2O_5$—$P_2O_5$ seal glasses.

In preparation of any glass samples, it is necessary to mix all starting materials excluding $P_2O_5$ in advance. This is because $P_2O_5$ is highly hygroscopic and its weight changes quickly by absorption of moisture from the air when $P_2O_5$ is left in the open air for a long time. Steps of preparing the glass samples comprise putting the powder mixture of the starting materials excluding $P_2O_5$ in an alumina crucible, placing the crucible on the scale, weighing a required quantity of $P_2O_5$ in the crucible on the scale, and immediately mixed up the materials in the crucible with a metallic spoon. In this case, it is not preferable to use a mortar or a ball mill for mixing.

The following steps comprise putting the aluminum crucible with the powder mixture of the materials in a glass melting furnace, starting to heat at a heat-up rate of 5° C./min, and keeping the target temperature for one hour after the temperature reaches the target temperature. This embodiment sets the target temperature to 1000° C. Further, the following steps include keeping stirring the molten mixture for one hour, taking out the crucible from the glass melting furnace, casting the molten mixture into a graphite mold that is kept at 300° C. in advance, moving the graphite mold with the molten mixture into the unstraining furnace which was kept at a predetermined unstraining temperature, leaving the crucible in the furnace for one hour to unstrain the glass, and then cooling the crucible down to the room temperature at a cooling rate of 1° C./min. The obtained glass block is 30 mm×40 mm×80 mm. The above steps are repeated to prepare the other glasses of compositions listed in Table 2.

TABLE 2

| No. | $V_2O_5$ | $P_2O_5$ | BaO | $WO_3$ | $TeO_2$ | $Sb_2O_3$ |
|---|---|---|---|---|---|---|
| TAS-1 | 45 | 30 | 10 | 0 | 5 | 10 |
| TAS-2 | 50 | 25 | 10 | 5 | 0 | 10 |
| TAS-3 | 55 | 25 | 9 | 0 | 5 | 6 |
| TAS-4 | 55 | 20 | 5 | 0 | 15 | 5 |
| TAS-5 | 55 | 25 | 5 | 0 | 5 | 10 |
| TAS-6 | 52 | 22 | 5 | 8 | 5 | 8 |
| TAS-7 | 50 | 25 | 15 | 0 | 5 | 5 |
| TAS-8 | 65 | 15 | 10 | 0 | 5 | 5 |
| TAS-9 | 57 | 22 | 5 | 0 | 8 | 8 |
| TAS-10 | 58 | 22 | 5 | 0 | 7 | 8 |
| TAS-11 | 60 | 20 | 6 | 0 | 6 | 8 |

After measuring the surface resistance of the obtained glass block, the glass block was cut into pieces of 4 mm×4 mm×15 mm each, and measured and evaluated the coefficient of thermal expansion of the glass pieces. Further, the residual glass material was crushed into glass powder and performed DTA analysis on the glass powder. Table 3 lists the physical properties of the prepared $V_2O_5$-$P_2O_5$ seal glass. In Table 3, symbols indicate the following: Tg for glass transition point, Mg for yielding point, Ts for softening point, and Tf for fluidity point. The appropriate sealing temperature is between Ts (glass softening point) and Tf (glass fluidity point).

It is possible to change the coefficient of thermal expansion of the glass in the range of 60 to $90 \times 10^{-7}/°$ C. by changing the glass composition as shown in Table 3. It is possible to lower the sealing temperature by adding a little amount of $TeO_2$ to the glass. TAS-4, 6, and 8 contain a large amount of $TeO_2$, $WO_3$ or $V_2O_5$. Therefore, their coefficients of thermal expansion exceed $90 \times 10^{-7}/°$ C. and cannot be in the range of 60 to $90 \times^{-7}/°$ C. or less.

TABLE 3

| No. | Tg (° C.) | Mg (° C.) | Ts (° C.) | Tf (° C.) | Crystallization temperature (° C.) | Crystallization peak temperature (° C.) | Coefficient of thermal expansion ($\times 10^{-7}$/° C.) |
|---|---|---|---|---|---|---|---|
| TAS-1  | 345 | 370 | 420 | 475 | 515 | 530 | 66 |
| TAS-2  | 350 | 375 | 430 | 485 | 526 | 541 | 75 |
| TAS-3  | 370 | 395 | 445 | 495 | 537 | 552 | 84 |
| TAS-4  | 345 | 365 | 425 | 480 | 520 | 536 | 103 |
| TAS-5  | 340 | 365 | 425 | 480 | 520 | 536 | 82 |
| TAS-6  | 345 | 360 | 435 | 505 | 548 | 563 | 95 |
| TAS-7  | 345 | 365 | 420 | 480 | 520 | 536 | 82 |
| TAS-8  | 345 | 354 | 415 | 495 | 537 | 552 | 98 |
| TAS-9  | 335 | 343 | 403 | 480 | 521 | 536 | 82 |
| TAS-10 | 325 | 333 | 390 | 466 | 505 | 520 | 79 |
| TAS-11 | 315 | 323 | 379 | 452 | 490 | 504 | 77 |

TAS-1 was selected from $V_2O_5$—$P_2O_5$ glasses listed in Table 2, and a filler material and glass beads were added to TAS-1. Both the filler material and glass beads are silica glasses. We evaluated the fluidity of powder mixture of the glass material and behavior of crystallization of the glass material since the glass of this invention is used for sealing.

To evaluate the fluidity of glass materials, we employed a button flow test to evaluate the fluidity of powder mixture of the glass material. The button flow test comprises the steps of placing button-shaped heaps of the sealing frit powder on a non-sealing glass plate, heating thereof until they melt, and measuring the diameters of the molten button-shaped glass materials. At the same time, the reactivity of the glass material (sample) with the substrate, occurrence of cracks in the substrate, and generation of gas bubbles in the molten glass sample were investigated during this test. The glass sample were acceptable when the button-shaped glass sample of 10 mm in diameter and 5 mm thick spreads out to have a diameter of 15 mm or more and has no crack and gas bubbles between the substrates.

The button flow test method is shown in the following.

Samples TASF-1 to TASF-18 that were molded into button-like shapes were placed on a sealed glass substrate at room temperature, followed by heating them at a rate of 5° C./min, keeping them at 420° C. for 30 minutes, cooling them down to 200° C. at a rate of 2° C./min, and leaving them still until the temperature reached to room temperature.

Table 4 lists the results of the button flow test.

The tested samples were evaluated as follows:
(As for the fluidity of the glass)
Evaluation "⊚": The button sample spread out and its diameter is 15 mm or more. There is no crack between the sample and the substrate and no gas bubble is found in the sample.
Evaluation "○": The button sample spread out and its diameter is 15 mm or more.
Evaluation "x": The diameter of the molten button sample is less than 15 mm.
(As for the crystallization behavior)
Evaluation "⊚": No crystal peak is found by the X-ray diffraction analysis of the sample surface after the button flow test. The surface of the sample is found to be glossy (with the naked eye observation).
Evaluation "○": No crystal peak is found by the X-ray diffraction analysis of the sample surface after the button flow test but the surface of the sample is not glossy partially (by the naked eye observation).
Evaluation "x": Some crystal peaks are found by the X-ray diffraction analysis of the sample surface after the button flow test.

The glass sample that is evaluated "x" in the crystallization behavior test is devitrified.

Judging from the above test results, the preferable particle size of the filler is in the range of 1 to 150 μm. Further, it was not preferable to add the filler in a too much amount to the glass bonding material and a preferable mixing rate of the filler is 0.1 to 1.0% by volume of the bonding material.

TABLE 4

| Number | Particle size of filler (d90) (μm) | Mixing rate of filler (% by volume) | Particle size of glass bead (μm) | Mixing ratio of glass beads (% by volume) | Flow characteristics | Crystallization behavior |
|---|---|---|---|---|---|---|
| TASF-1-1 | 1   | 20 | 50  | 0.5 | ○ | ○ |
| TASF-1-2 | 1   | 40 | 50  | 0.5 | ○ | ○ |
| TASF-2-1 | 5   | 10 | 100 | 0.5 | ⊚ | ⊚ |
| TASF-2-2 | 5   | 20 | 100 | 0.5 | ⊚ | ⊚ |
| TASF-3-1 | 10  | 20 | 150 | 0.5 | ⊚ | ⊚ |
| TASF-3-2 | 10  | 40 | 150 | 0.5 | ⊚ | ⊚ |
| TASF-4-1 | 20  | 30 | 200 | 0.5 | ⊚ | ⊚ |
| TASF-4-2 | 20  | 60 | 200 | 0.5 | ⊚ | ⊚ |
| TASF-5-1 | 50  | 10 | 50  | 0.5 | ⊚ | ⊚ |
| TASF-5-2 | 50  | 20 | 50  | 0.5 | ⊚ | ⊚ |
| TASF-6-1 | 100 | 20 | 100 | 0.5 | ⊚ | ○ |
| TASF-6-2 | 100 | 40 | 100 | 0.5 | ⊚ | ○ |
| TASF-7-1 | 150 | 30 | 150 | 0.5 | ⊚ | ○ |
| TASF-7-2 | 150 | 60 | 150 | 0.5 | ⊚ | ○ |

TABLE 4-continued

| Number | Particle size of filler (d90) (μm) | Mixing rate of filler (% by volume) | Particle size of glass bead (μm) | Mixing ratio of glass beads (% by volume) | Flow characteristics | Crystallization behavior |
|---|---|---|---|---|---|---|
| TASF-8-1 | 180 | 10 | 200 | 0.5 | ○ | X |
| TASF-8-2 | 180 | 20 | 200 | 0.5 | ○ | X |
| TASF-9-1 | 210 | 20 | 50 | 0.5 | X | X |
| TASF-9-2 | 210 | 40 | 50 | 0.5 | X | X |
| TASF-10-1 | 300 | 30 | 100 | 0.5 | X | X |
| TASF-10-2 | 300 | 60 | 100 | 0.5 | X | X |
| TASF-11-1 | 10 | 10 | 150 | 0.1 | ◉ | ◉ |
| TASF-11-2 | 10 | 20 | 150 | 0.1 | ◉ | ◉ |
| TASF-12-1 | 10 | 20 | 200 | 0.2 | ◉ | ◉ |
| TASF-12-2 | 10 | 40 | 200 | 0.2 | ◉ | ◉ |
| TASF-13-1 | 10 | 40 | 50 | 0.5 | X | X |
| TASF-13-2 | 10 | 80 | 50 | 0.5 | X | X |
| TASF-14-1 | 10 | 10 | 100 | 0.7 | ◉ | ○ |
| TASF-14-2 | 10 | 20 | 100 | 0.7 | ◉ | ○ |
| TASF-15-1 | 10 | 20 | 150 | 1 | ○ | ○ |
| TASF-15-2 | 10 | 40 | 150 | 1 | ○ | ○ |
| TASF-16-1 | 10 | 30 | 200 | 1.5 | ○ | X |
| TASF-16-2 | 10 | 60 | 200 | 1.5 | ○ | X |
| TASF-17-1 | 10 | 10 | 100 | 2 | X | X |
| TASF-17-2 | 10 | 20 | 100 | 2 | X | X |
| TASF-18-1 | 10 | 20 | 200 | 2.5 | X | X |
| TASF-18-2 | 10 | 40 | 200 | 2.5 | X | X |

Embodiment 2

Figure 9:
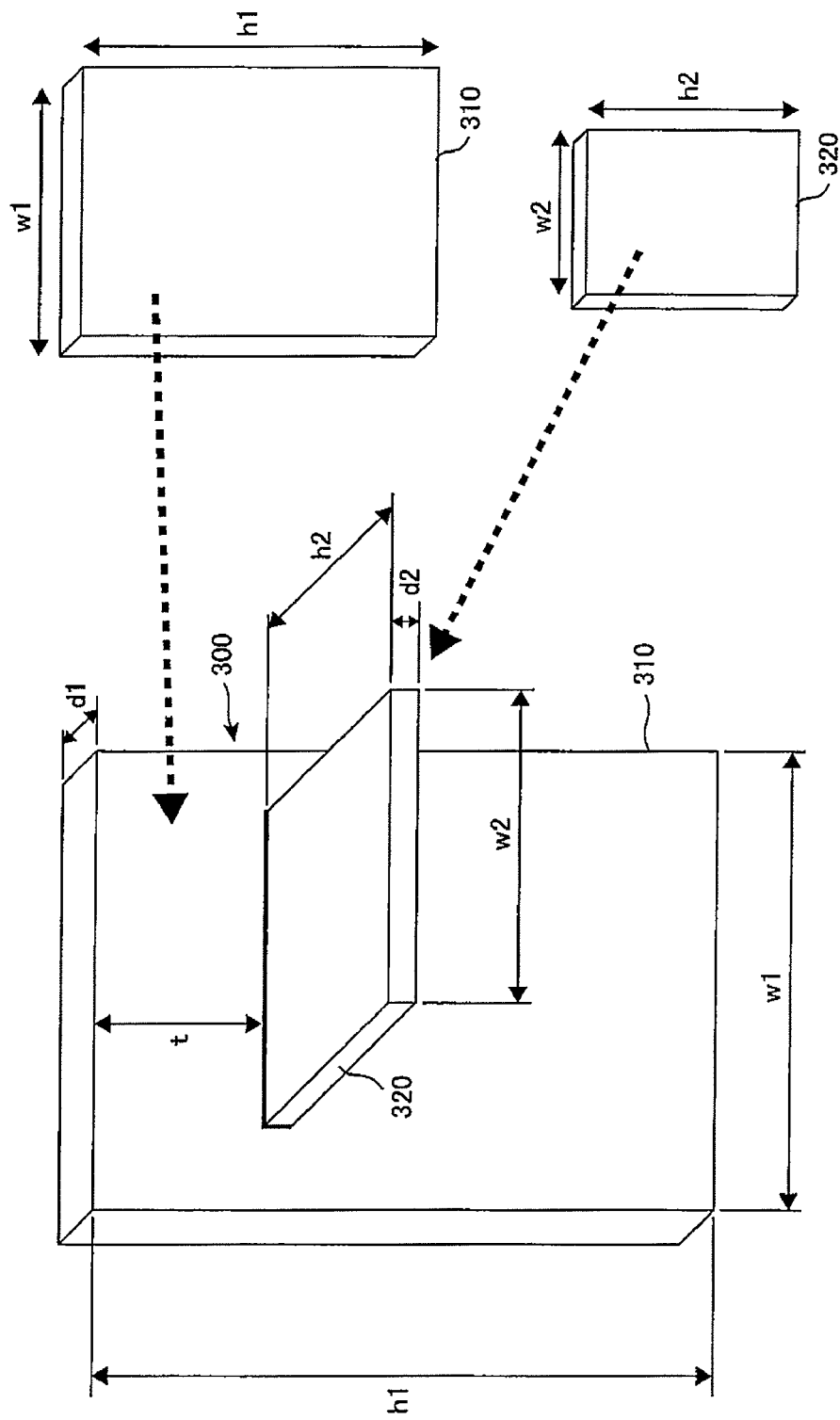
FIG. 9 is a schematic diagram of the structure of a test piece for evaluation of the bonding strength of the glass.

The bonding strengths of the bonding materials containing the fillers and glass beads that were prepared by Embodiment 1. FIG. 9 is an explanatory drawing of a test piece of bonding material whose bonding strength is to be evaluated.

FIG. 10 is an explanatory drawing of a strength evaluation test which uses a test piece of FIG. 9.

As shown in FIG. 9, test piece 300 for bonding strength evaluation comprises first part 310 of width w1×height h1×thickness d1 and second part 320 of width w2×height h2×thickness d2 which are bonded together to form a T-shape. In details, dimensional values are as follows: w1=25 mm, w2=15 mm, h1=50 mm, h2=20 mm, d1=2.8 mm, and d2=2.8 mm. The bonding location of second part 320 (the distance of the second part from the top end of the first part) is 15 mm.

The bonding strength test uses a test piece prepared by inserting the free end of first part 310 that is bonded to test piece 300 (for bonding strength evaluation) of FIG. 10A into the groove of sample holder 330 of FIG. 10B. FIG. 11C shows an image of the bonding strength test. The first part is tightly fastened by a screw which is screwed into the screw hole. Sample holder 330 is anchored to base 340. FIG. 10(c) contains top and side views of the test piece.

As shown in FIG. 10C, pusher 350 is pushed against the second part of test piece 300 that is bonded to sample holder 330 to apply load W to the second part. Load W is gradually increased until the bonded part of the test piece is broken and the load (W) is measured when the bonded part is broken. The test results are listed in Table 5. Table 5 also lists breaking stresses of the well known Pb glasses and V—Te glasses that contain $V_2O_5$ and $TeO_2$ as the main ingredients for comparison.

Judging from the results of the strength measurement, the breaking stress and the bonding strength go down when the particle size of filler becomes over 150 μm. The breaking stress is apt to go down as the amount of the filler to be added increases. Further, the breaking stress is not affected when the ratio of glass beads to be mixed is 1.0% or less (by volume), but both the breaking stress and the bonding strength go down when the amount of the glass beads to be mixed becomes over 1.5% (by volume).

TABLE 5

| Number | Particle size of filler (d90) (μm) | Mixing ratio of filler (% by volume) | Particle size of glass bead (μm) | Mixing ratio of glass beads (% by volume) | Breaking stress of bonding material (MPa) |
|---|---|---|---|---|---|
| TASF-1-1 | 1 | 20 | 50 | 0.5 | 75.5 |
| TASF-1-2 | 1 | 40 | 50 | 0.5 | 64.2 |
| TASF-2-1 | 5 | 10 | 100 | 0.5 | 70.8 |
| TASF-2-2 | 5 | 20 | 100 | 0.5 | 60.2 |
| TASF-3-1 | 10 | 20 | 150 | 0.5 | 61.5 |
| TASF-3-2 | 10 | 40 | 150 | 0.5 | 52.3 |
| TASF-4-1 | 20 | 30 | 200 | 0.5 | 46.7 |
| TASF-4-2 | 20 | 60 | 200 | 0.5 | 39.7 |
| TASF-5-1 | 50 | 10 | 50 | 0.5 | 55.3 |
| TASF-5-2 | 50 | 20 | 50 | 0.5 | 47.0 |
| TASF-6-1 | 100 | 20 | 100 | 0.5 | 60.8 |
| TASF-6-2 | 100 | 40 | 100 | 0.5 | 51.7 |
| TASF-7-1 | 150 | 30 | 150 | 0.5 | 48.1 |
| TASF-7-2 | 150 | 60 | 150 | 0.5 | 40.9 |
| TASF-8-1 | 180 | 10 | 200 | 0.5 | 32.0 |

TABLE 5-continued

| Number | Particle size of filler (d90) (μm) | Mixing ratio of filler (% by volume) | Particle size of glass bead (μm) | Mixing ratio of glass beads (% by volume) | Breaking stress of bonding material (MPa) |
|---|---|---|---|---|---|
| TASF-8-2 | 180 | 20 | 200 | 0.5 | 27.2 |
| TASF-9-1 | 210 | 20 | 50 | 0.5 | 28.9 |
| TASF-9-2 | 210 | 40 | 50 | 0.5 | 24.6 |
| TASF-10-1 | 300 | 30 | 100 | 0.5 | Not bonded |
| TASF-10-2 | 300 | 60 | 100 | 0.5 | Not bonded |
| TASF-11-1 | 10 | 10 | 150 | 0.1 | 62.5 |
| TASF-11-2 | 10 | 20 | 150 | 0.1 | 53.2 |
| TASF-12-1 | 10 | 20 | 200 | 0.2 | 58.6 |
| TASF-12-2 | 10 | 40 | 200 | 0.2 | 49.8 |
| TASF-13-1 | 10 | 40 | 50 | 0.5 | 45.1 |
| TASF-13-2 | 10 | 80 | 50 | 0.5 | 38.3 |
| TASF-14-1 | 10 | 10 | 100 | 0.7 | 57.7 |
| TASF-14-2 | 10 | 20 | 100 | 0.7 | 49.0 |
| TASF-15-1 | 10 | 20 | 150 | 1 | 63.2 |
| TASF-15-2 | 10 | 40 | 150 | 1 | 53.7 |
| TASF-16-1 | 10 | 30 | 200 | 1.5 | 43.6 |
| TASF-16-2 | 10 | 60 | 200 | 1.5 | 37.1 |
| TASF-17-1 | 10 | 10 | 100 | 2 | 42.3 |
| TASF-17-2 | 10 | 20 | 100 | 2 | 36.0 |
| TASF-18-1 | 10 | 20 | 200 | 2.5 | 39.5 |
| TASF-18-2 | 10 | 40 | 200 | 2.5 | 33.6 |
| Conventional material (Pb glass) | | | | | 65.5 |
| Conventional material (V-Te glass) | | | | | 67.3 |

What is claimed is:

1. A display apparatus comprising a rear substrate equipped with a plurality of electron sources and a front substrate equipped with a plurality of fluorescent materials wherein the substrates are oppositely placed to form a space therebetween and peripheral portions of the substrates are hermetically sealed with a bonding material to keep the sealed space under a reduced pressure; wherein
the bonding material is a mixture of a filler and a glass that contains vanadium and phosphorous as main ingredients and the glass is a vanadate-phosphate glass that contains $V_2O_5$ of 45 to 60%, $P_2O_5$ of 15 to 30%, BaO of 5 to 15%, and $Sb_2O_3$ of 5 to 10% (by weight) in converted values as oxides.

2. A display apparatus comprising a rear substrate equipped with a plurality of electron sources and a front substrate equipped with a plurality of fluorescent materials wherein the substrates are oppositely placed to form a space therebetween and the peripheral portions of the substrates are hermetically sealed with bonding material to keep the sealed space under a reduced pressure; wherein
the bonding material is made of a glass that contains at least vanadium, phosphorous, barium, and antimony; and amounts of the ingredients are 15 to 35% of BaO and $Sb_2O_3$ in total in converted values as oxides and a ratio of BaO to $Sb_2O_3$ or $Sb_2O_3$ to BaO is 0.3 or less.

3. The display apparatus according to claim 2, wherein the bonding material contains 20 to 90% (by volume) of a glass ingredient and 10 to 80% (by volume) of filler.

4. The display apparatus according to claim 3, wherein the filler is at least one selected from the group consisting of $SiO_2$, $ZrO_2$, $Al_2O_3$, $ZrSiO_4$, cordierite, mullite, and eucryptite and a mean particle size thereof is 0.5 to 10 μm.

5. The display apparatus according to claim 2, wherein the glass contains 45 to 60% (by weight) of $V_2O_5$ in a converted value as vanadium oxide and 15 to 30% (by weight) of $P_2O_5$ in a converted value as phosphorous oxide.

6. The display apparatus according to claim 2, wherein a marginal frame is provided between the front and rear substrates.

7. The display apparatus according to claim 2, wherein the bonding material contains glass beads by 0.1 to 1.0% (by volume) of the bonding material whose particle size is 90 to 100% of a distance of the space between the front and rear substrates.

8. The display apparatus according to claim 2, wherein the front substrate has a peripheral rim that is curved and protruded towards the rear substrate, the front and rear substrates therewith being bonded to each other.

9. The display apparatus according to claim 2, wherein the glass contains at least one of Ag, Cu, Cs, Hf, Na, K and Te as an additive by 1 to 10% by weight in a converted value as oxides of $Ag_2O$, $Cu_2O$, $Cs_2O$, $HfO_2$, $Na_2O$, $K_2O$ and $TeO_2$.

10. The display apparatus according to claim 1, wherein the glass is a vanadate-phosphate glass that contains $V_2O_5$ of 45 to 60%, $P_2O_5$ of 20 to 30%, BaO of 5 to 15%, $TeO_2$ of 0 to 10%, $Sb_2O_3$ of 5 to 10%, and $WO_3$ of 0 to 5% (by weight); the filler is at least one selected from the group consisting of silica glass, mullite, ceramic, fireclay refractory, steatite, alumina and spinel, and a particle size of the filler is 1 to 150 μm.

11. The display apparatus according to claim 10, wherein a coefficient of thermal expansion of the vanadate-phosphate glass is in a range of 60 to 90×10$^{-7}$/° C. and a coefficient of thermal expansion of the filler is 60×10$^{-7}$/° C. or less.

12. The display apparatus according to claim 11, wherein the bonding material is mixed with glass beads of 50 to 200 μm in size and the glass beads dispersed in the filler is 0.1 to 1.0% by volume.

13. The display apparatus according to claim 11, wherein the coefficient of thermal expansion of the glass beads is 60×10$^{-7}$/° C. or less.

14. The display apparatus according to claim 11, wherein the display apparatus is a field emission type display that is equipped with two glass substrates one of which has the electron sources that emit electrons and the other of which is equipped with the fluorescent material that receive electrons to be excited thereby emitting light.

15. The display apparatus according to claim 11, wherein the display apparatus is a plasma display apparatus.

16. A plasma display apparatus equipped with a front substrate and a rear substrate that is provided oppositely to the front substrate and partition walls that are formed on the rear substrate to provide a space between the front and rear substrates, wherein the partition walls are made of a glass that contains at least vanadium, phosphorous, barium and antimony and an amount of ingredients contained in the glass are 15 to 35% of BaO and $Sb_2O_3$ in total by weight and the ratio by weight of BaO to $Sb_2O_3$ or $Sb_2O_3$ to BaO is 0.3 or less.

* * * * *